United States Patent [19]

Lester

[11] Patent Number: 4,519,023
[45] Date of Patent: May 21, 1985

[54] SELF-OSCILLATING INVERTER INCLUDING A DC TO DC CONVERTER AND METHOD FOR CONTROL THEREOF

[75] Inventor: Theodore V. Lester, Schiller Park, Ill.

[73] Assignee: Motorola, Inc., Schaumburg, Ill.

[21] Appl. No.: 496,378

[22] Filed: May 20, 1983

[51] Int. Cl.³ .................. H02H 7/122; H02M 3/335
[52] U.S. Cl. ............................... 363/56; 363/22
[58] Field of Search .................... 363/22-23, 363/50, 55-56, 97, 131, 133-134; 331/113 R, 113 A, 114

[56] References Cited

U.S. PATENT DOCUMENTS

| | | | |
|---|---|---|---|
| 3,219,906 | 11/1965 | Keller et al. | 363/25 |
| 3,274,479 | 9/1966 | Kurimura et al. | 363/97 |
| 3,611,330 | 10/1971 | Cacossa | 363/97 |
| 3,663,944 | 5/1972 | Low et al. | 363/133 |
| 3,696,285 | 10/1972 | Saia | 363/22 X |
| 4,127,894 | 11/1978 | Bishop et al. | 363/56 |
| 4,177,509 | 12/1979 | Bullinga | 363/133 |
| 4,245,928 | 1/1981 | Mineck et al. | 363/41 |
| 4,308,576 | 12/1981 | Clark, Jr. | 363/56 |
| 4,319,315 | 3/1982 | Keeney, Jr. et al. | 363/22 |

OTHER PUBLICATIONS

Palmer & Haver, "The ABC's of DC to AC inverters," 7/79, *Motorola Appln.*, Note AN-222A.
Gutmann & Suva, "A Line Operated, Regulated 5V/50A Switching Power Supply," 4/80, *Motorola Appln.*, Note AN-767.
Alberkrack, "A Simplified Power Supply Design Using the TL494 Control Circuit," 4/81, *Motorola Eng.*, Bulletin EB-100.

*Primary Examiner*—Peter S. Wong
*Attorney, Agent, or Firm*—Phillip H. Melamed; James W. Gillman; William J. Kubida

[57] ABSTRACT

A self oscillating inverter including a DC to DC converter and method for control thereof which senses the onset of a transformer core saturation to control its operation without dependence thereon. Linearizing inductors in the transformer secondary function to maintain a ramp shaped collector current waveform under full load conditions to allow control of output voltage by varying the oscillator frequency.

19 Claims, 9 Drawing Figures

NOTE: $V_{OUT} = \dfrac{N_2}{2N_1} V_{PRIMARY}$

SELF-OSCILLATING INVERTER INCLUDING A DC TO DC CONVERTER AND METHOD FOR CONTROL THEREOF

BACKGROUND OF THE INVENTION

The present invention relates, in general, to the field of DC to AC inverters and DC to DC converters and methods for use with the same. More particularly, the present invention relates to a drive control circuit and method for such inverters and converters and especial utility in conjunction with one-transformer, over-driven, push-pull, transformer-coupled, transistor oscillators.

Numerous circuits for DC to AC inverters and related DC to DC converters have heretofore been disclosed in the prior art. Such circuits have virtually innumerable variations and applications in present technology. An exhaustive examination of the entire field of the various DC to AC inverters and their characteristics has been conducted and described by Merrill Palmer and Robert J. Haver in their monograph entitled "The ABC's of DC to AC Inverters" published in 1979 as Application Note AN-222A by Motorola, Inc., assignee of the present invention.

In analyzing these prior art inverters and converters, numerous tradeoffs have been necessary to achieve a specific desired performance while keeping complexity and parts count to a minimum to control cost. Of all such devices previiously available, the least costly to produce is the one-transformer self-oscillating feedback oscillator. By using a single transformer the number of most costly elements in the circuit is, at once, minimized. Utilizing a pair of push-pull connected transistors which receive oscillation drive from a feedback winding and are used to drive the transformer primary provides a further saving over driven or bridge inverters.

A decided disadvantage, however, has been that the transistor pair must be closely matched in characteristics particularly beta ($H_{fe}$) and turnoff times. Any mismatch can lead to simultaneous conduction of the transistors or to "current hogging" by which imbalance the transformer core can become saturated with an undesirable net DC bias. Providing for such imbalance in these push-pull devices which utilize core saturation to control oscillation would, in turn, require a larger, more expensive transformer. Other interrelated difficulties have included the setting of the oscillator frequency which has generally been dependent primarily on the transformer characteristics.

SUMMARY OF THE INVENTION

It is therefore an object of the present invention to provide an improved self-oscillating DC to AC inverter useable in a DC to DC converter and a method for control thereof.

It is further an object of the present invention to provide an improved self-oscillating inverter including a DC to DC converter and method for control thereof which is readily and economically effectuated.

It is still further an object of the present invention to provide an improved self-oscillating inverter including a DC to DC converter and method for control thereof which allows for mismatch between transistor characteristics in the push-pull driver stage.

It is still further an object of the present invention to provide an improved self-oscillating inverter including a DC to DC converter and method for control thereof which obviates simultaneous conduction problems between transistors in the push-pull driver stage.

It is still further an object of the present invention to provide an improved self-oscillating inverter including a DC to DC converter and method for control thereof which reduces "current hogging" by avoiding dependence on transformer core saturation for the timing of the oscillator cycle.

It is still further an object of the present invention to provide an improved self-oscillating inverter including a DC to DC converter and method for control thereof which provides for control of oscillator frequency and output voltage independent of transformer parameters.

The foregoing and other objects are achieved in the present invention wherein there is provided a control circuit and method for a one-transformer DC to AC inverter comprising first and second means for alternately switching a current through a primary winding of the transformer connected to like first electrodes of the first and second switching means. Means are connected to common connected second electrodes of the first and second switching means for sensing a level of the current therethrough. Means are also coupled to respective third electrodes of the first and second switching means for comparing the current level to a reference level and alternately deactivating the first and second switching means each time the current level is substantially equal to the reference level. Preferably inductively loading means is provided for insuring the sensed current has a gradual linear ramp shape throughout the conduction time of the switching means until said reference level is reached.

A one-transformer self oscillation DC to DC converter and method in accordance with the present invention further comprises, in addition to the above, means connected to a secondary winding of the transformer for converting a variable polarity voltage signal induced thereat to a constant polarity voltage. Means are also coupled to the converting means for inductively loading the transformer to impart a generally ramped shaped waveform to the current through the first and second switching means.

BRIEF DESCRIPTION OF THE DRAWINGS

The above mentioned and other features and objects of the invention and the manner of attaining them will become more apparent and the invention itself will be best understood by reference to the following description of an embodiment of the invention taken in conjunction with the accompanying drawings, wherein.

DESCRIPTION OF A PREFERRED EMBODIMENT

Figure 1:
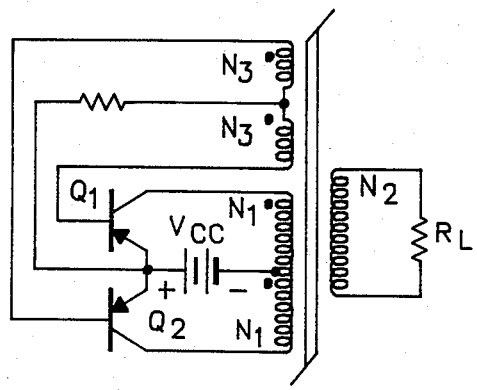
FIG. 1 illustrates a prior art, over-driven, common emitter connected, push-pull, transformer-coupled transistor oscillator DC to AC inverter useful in understanding the principles of the present invention.
Figure 2:
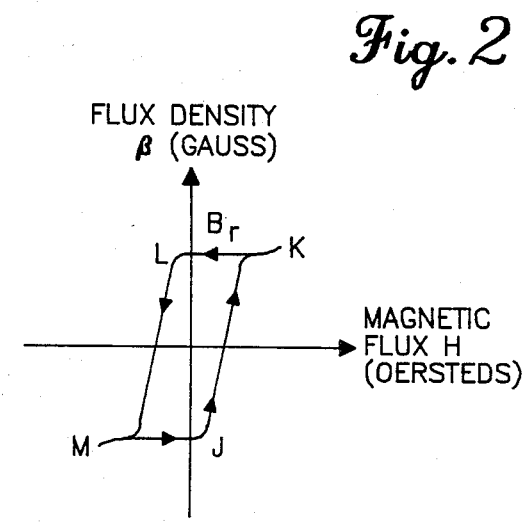
FIG. 2 is a flux density ($\beta$) versus magnetic flux (H) curve for the prior art inverter of FIG. 1.
Figure 3A:
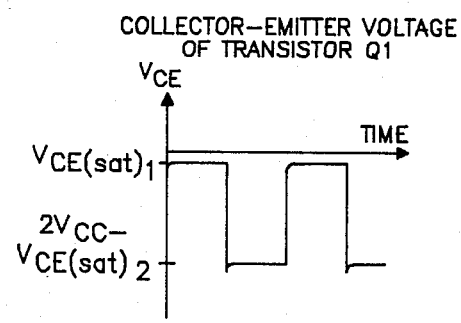
FIGS. 3a–3e illustrate typical voltage and current waveforms illustrative of the operation of the prior art inverter of FIG. 1.
Figure 3B:
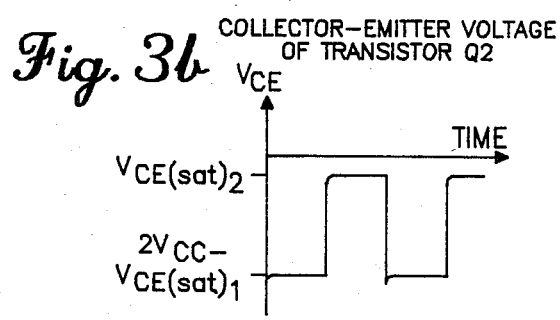
Figure 3C:
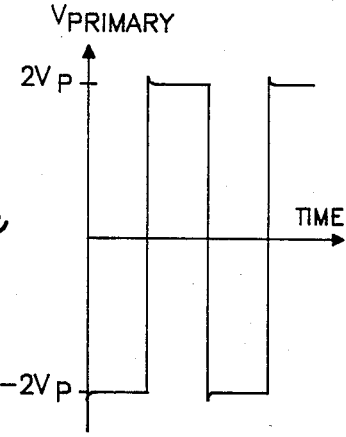
Figure 3D:
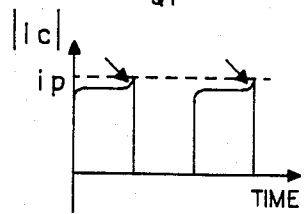
Figure 3E:
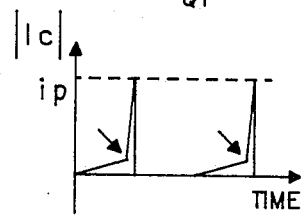

With reference to FIG. 1, a prior art, over-driven, push-pull, transformer-coupled transistor oscillator circuit is shown. Consideration of this prior art circuit in conjunction with the associated transformer B-H curve of FIG. 2 and the following description excerpted from: Palmer, M. and Haver, R. J.; "The ABC's of DC to AC Inverters" Motorola Application Note AN-222A; 1979 at pages 2-3, is useful in understanding the principles of the present invention in relation to prior art circuits.

Assume that transistor $Q_1$ is nonconducting, $Q_2$ conducting, and the transformer saturated at point J on the B-H curve. When $Q_1$ starts to conduct, the voltage developed across the primary windings $N_1$ induces voltage in the feedback windings $N_3$ such as to rapidly drive $Q_1$ into saturation and turn $Q_2$ off. When this transition is completed, constant voltage $V_p = V_{CC} - V_{CE(sat)}$ is applied to $N_1$. Since $$\frac{d\phi}{dt} = \frac{V_p}{N_1}$$

flux $\phi$ must increase in the transformer core at a constant rate, causing flux density $B = \phi/A$ to increase from point J toward point K on the B-H curve. As long as the core remains nonsaturated, magnetization current $i_m (=Hl/N_1)$ is small, but as saturation (point K) is approached high magnetization current $i_m$ is required to keep $d\phi/dt$ constant (l is the magnetic path length). When reflected load current plus this sharply increasing magnetization current exceeds the collector current which $Q_1$ can supply (with the drive available), $Q_1$ begins to come out of saturation causing $V_p$ to decrease. $V_{FB}$ and $I_C$ decrease regeneratively, turning $Q_1$ off and ending the half cycle.

As flux in the transformer core collapses from point K to point $B_r$, voltage is induced in the winding which biases transistor $Q_2$ into conduction and initiates the next half cycle. The operation is similar to the first half cycle except that supply voltage (less $V_{CE(sat)}$) is applied to the other half of the primary, causing a reversal of polarity in the induced output-voltage. $Q_2$ conducts until the core is driven into negative saturation at point M on the B-H curve. As flux collapses from M to J the full cycle is completed.

Typical voltage and current waveforms for one transformer inverter operation are shown in FIGS. 3a-3e. It can be seen from the collector-to-emitter voltage waveforms of FIGS. 3a and 3b that each device is subjected in the off condition to a voltage approximately twice the supply voltage plus any induced voltage that may occur in the circuit due to leakage inductance, etc. Also significant is the fact that the same maximum collector current $i_p$ is required for switching action whether this current is primarily reflected load current, as in FIG. 3d, or totally magnetization current, as in FIG. 3e. This will obviously limit efficiency at low output loads.

Operating frequency of the inverter is determined by the voltage $V_p$ and by the saturation characteristics of the transformer core according to the relationship $$f = \frac{V_p \times 10^8}{4\beta_s A N_1} \text{ cps.}$$

$\beta_s$ is saturated flux density in gauss, A is cross-sectional area of the core in $cm^2$, and $N_1$ is the number of turns on one half of the primary.

Figure 4:
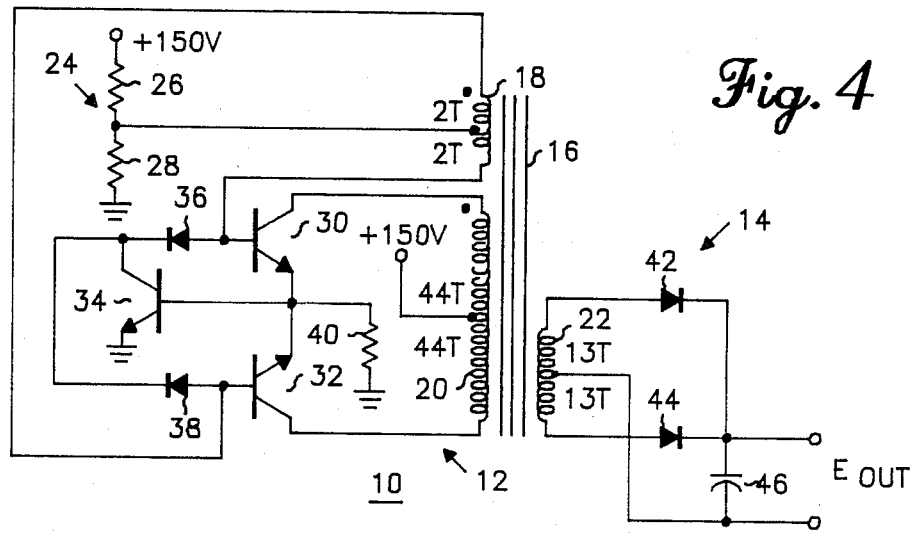
FIG. 4 illustrates an improved DC to DC converter in accordance with the present invention.

Referring now to FIG. 4, a DC to DC self oscillating one transformer converter 10 in accordance with the present invention is shown. DC to DC converter 10 comprises in pertinent part a push-pull input stage 12 coupled to a transformer coupled output stage 14 through transformer 16. Transformer 16 comprises feedback winding 18 and primary winding 20 as well as secondary winding 22. As shown, feedback winding 18 comprises a winding of approximately four turns with a center tap. The center tap of feedback winding 18 is connected to a voltage divider 24 comprising series connected resistors 26 and 28 connected between a source of positive 150 volts and circuit ground. Feedback winding 18 is connected in parallel with the base electrodes of output transistors 30 and 32 as will be more fully described hereinafter.

Primary winding 20 comprises approximately 88 turns having a center tap connected to a source of positive 150 volts. Primary winding 20 is connected in parallel across the collector electrodes of output transistors 30 and 32 connected in a common emitter configuration for providing a push-pull driver to transformer 16.

The base electrodes of output transistors 30 and 32 are connected to the collector electrode of transistor 34 by means of diodes 36 and 38 respectively. The emitter electrode of transistor 34 is connected to circuit ground while the base electrode thereof is connected to the common connected emitters of output tranistors 30 and 32 which in turn are connected to circuit ground through sampling resistor 40.

A conventional transformer coupled output stage 14 is shown comprising a 26-turn secondary winding 22 having a center tap providing one lead for providing a DC (constant polarity) output voltage $E_{out}$ derived from the AC (variable polarity) signal induced in the secondary winding 22. Secondary winding 22 is connected, as shown, to the anode of diodes 42 and 44 which have their cathodes connected in common for providing a second lead for output voltage $E_{out}$. A filter capacitor 46 is placed in parallel between the output leads of transformer coupled output stage 14.

Figure 5:
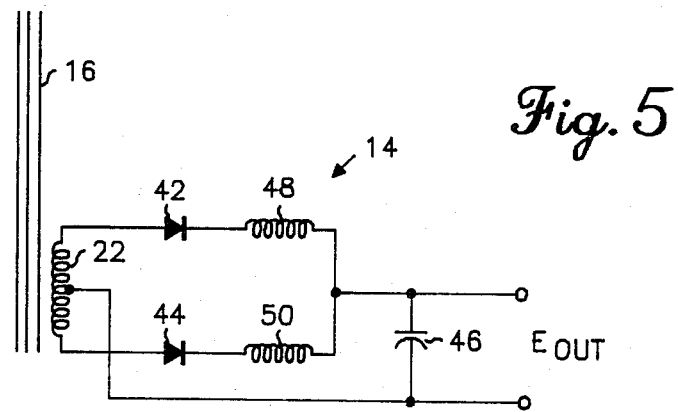
FIG. 5 illustrates an alternative secondary winding circuit for use with the primary winding circuitry shown in FIG. 4 which allows for the collector current in the push-pull connected transistors to maintain a ramped waveform under full load conditions.

Referring additionally now to FIG. 5, an alternative transformer coupled output stage 14 is shown. With respect to this figure, like elements to that above described with respect to FIG. 4 are like numbered and the foregoing description thereof shall suffice as a description herefor. Utilizing this alternative transformer coupled output stage 14, a pair of linearizing inductors 48 and 50 are connected in series with the cathode leads of diodes 42 and 44 respectively. As will be hereinafter described, linearizing inductors 48 and 50 provide what is, in effect, a leakage inductance in transformer 16 such that the collector current of output transistors 30 and 32 will be of a generally ramp shaped waveform despite the load or output current level of transformer coupled output stage 14.

In operation, the combination of resistor 40, transistor 34 and diodes 36 and 38 function to keep the core of transformer 16 from saturating. If allowed to enter saturation, transformer 16 would function more as a resistive than inductive load to output transistors 30 and 32 thus resulting in an undesirable energy loss. Referring back also to FIGS. 3d and 3e, it will be noticed that the onset of core saturation results in a rapid increase in collector current ($I_c$) in output transistors 30 and 32 indicated by arrows at the beginning of a waveform spike. This rapid increase, or spike, is sensed as the emitter current of both output transistors 30 and 32 by means of resistor 40. The value of resistor 40 (2.2 to 8.2 ohms) is chosen such that the emitter current of the conducting transistor drops sufficient voltage in resistor 40 to turn on transistor 34 at a predetermined fixed current level just before transformer saturation. Thus transistor 34 functions as an effective current comparator which in response to the sensed transistor emitter current in transistors 30 and 32 compares this current to the reference current level needed in resistor 40 to provide the base-emitter turn on voltage for transistor 34. Diodes 36 and 38, having their cathode connected to the collector of transistor 34 and their anode to the base of output transistors 30 and 32 respectively, function to pull down the base of the appropriate one of output transistors 30 and 32 during an operational cycle. Whichever base of the transistors is positive during the cycle, is conducting into the primary winding 20 of transformer 16 and is, therefore, creating the current spike. So, by grounding the collector of transistor 34 at the appropriate time returning the cathodes of diodes 36 and 38 to circuit ground, the corresponding anode will pull down the appropriate base of output transistors 30 and 32.

With particular attention also to FIG. 5, linearizing inductors 48 and 50 add an additional leakage inductance to transformer 16 thereby causing the collector current ($I_c$) of output transistors 30 and 32 to maintain a generally constant slope (linear) increasing ramp shaped waveform (like the initial portion of the waveform of FIG. 3e) throughout the conduction time of each of the transistors 30 and 32 even while at full load (unlike the generally square waveform of FIG. 3d) until the reference current level is reached. Thus, by maintaining this current ramp waveform regardless of load, due to the inductances 48 and 50, and terminating the constant slope current ramp each time at an appropriate point (a predetermined current level prior to the onset of saturation) by the value of resistor 40, the height and duration of the ramp is determined and, hence, output voltage $E_{out}$ is controllable. This is because $E_{out}$ varies inversely as a function of the primary winding oscillation frequency since for a longer current ramp (lower oscillation frequency) a higher $V_p$ voltage will be obtained providing for a higher magnitude $E_{out}$. Thus, linearizing inductors 48 and 50 are used to control the oscillator frequency of DC to DC converter 10 and lessen the dependence of the circuit on transformer saturation characteristics since the reference current level is reached prior to saturation and the linearizing inductors provide a gradual substantially constant linear increase of primary winding current until the reference current level is reached. Providing such a gradual linear ramp current increase which is load independent is desirable since switching at the reference current level will then be easier to accurately implement and provide a predetermined $E_{out}$ without depending on transformer saturation characteristics or the magnitude of the load. Without such fixed load independent ramps for $I_c$ switching would either have to occur during the abrupt current increase during saturation or switching would have to occur at current levels prior to saturation and this would result in $E_{out}$ being load dependent since the oscillation frequency would vary substantially with the output load magnitude.

It should be noted that any method which varies transistor 34 conduction time as a result of a comparison between $E_{out}$ (or $V_p$ or primary winding current) with a constant reference voltage or current level can yield a regulated $E_{out}$ by varying the oscillating frequency of DC to DC converter 10. Of course this regulated $E_{out}$ is typically less that the maximum possible $E_{out}$ obtained by a load independent constant slope primary current and switching just at the onset of saturation provided by the present invention monitoring the emitter current or transistors 30 and 32. This differs from regulated inverters that operate at a fixed frequency and control the amount of time both output devices in a push-pull driven system are off. Linearizing inductors 48 and 50, in a preferred embodiment, will have a value of approximately 100 $\mu$H and, if desired, could be wound on a common core. It should also be noted, that it is possible to provide linearizing inductors 48 and 50 as a portion of transformer 16 instead of the discrete components shown. It should also be noted, that one means for providing comparison between $E_{out}$ with a constant reference voltage to yield a regulated $E_{out}$ by varying oscillator frequency would be by means of a comparator having one input related to $E_{out}$ and its output coupled through an associated optocoupler (a non-DC connection for isolation) to transistor 34. In the primary embodiment above described, transformer 16 may have a ferrite core such as a TDK H7C1EE30; diodes 36 and 38 may be any small signal silicon diodes while diodes 42 and 44 may be furnished as MR852's. Output transistors 30 and 32 and transistor 34 are conventional bipolar NPN transistors.

What has been provided therefore is an improved self oscillating inverter including a DC to DC converter and method for control thereof which is readily and economically effectuated and allows for mismatch between transistor characteristics in the push-pull driver stage. The present invention also obviates simultaneous conduction problems between transistors in the push-pull driver stage while reducing "current hogging" by avoiding dependence on transformer core saturation for the timing of the oscillator cycle. The improved self oscillating inverter including a DC to DC converter and method for control thereof in accordance with the present invention provides for control of oscillator frequency and output voltage independent of transformer parameters.

While there have been described above the principles of this invention in conjunction with specific apparatus, it is to be clearly understood that this description is made only by way of example and not as a limitation to the scope of the invention.

I claim:

1. A control circuit for a one-transformer DC to AC inverter comprising:
    first and second switching means for alternately switching a current through a primary winding of said transformer connected to like first electrodes of said first and second switching means;
    means connected to common connected second electrodes of said first and second switching means for sensing a level of said current therethrough;
    means coupled to respective third electrodes of said first and second switching means for comparing said sensed current level to a reference level, said reference level corresponding to a current level just less than the primary current required for transformer saturation, and alternately deactivating and activating said first and second switching means each time said current level is substantially equal to said reference level wherein transformer saturation is prevented; and inductive loading means coupled to a secondary winding of said transformer for providing a generally linear ramp shaped increasing waveform to said current through said first and second switch means throughout the conduction time thereof, respectively, until said reference level is reached.

2. The control circuit of claim 1 wherein said first and second switching means comprise transistors and wherein said first, second and third electrodes are collector, emitter and base electrodes respectively.

3. The control circuit of claim 1 which includes means for coupling a feedback winding of said transformer to said first and second switching means for forming a self oscillating transformer circuit.

4. The control circuit of claim 1 wherein said sensing means comprises a sampling resistor.

5. The control circuit of claim 1 wherein said comparing means comprises a transistor and a pair of diodes, said diodes each having first like electrodes connected together and second like electrodes coupled, respectively, to control electrodes of said first and second switching means corresponding to said third electrodes of said first and second switching means, said transistor having a control electrode connected to said current sensing means and an output electrode connected to said common connected diode first electrodes.

6. A method for controlling a DC to AC inverter comprising the steps of:

alternately switching a current through a transformer primary winding by first and second switching means connected thereto at respective first electrodes thereof;

sensing a level of current through said first and second switching means by means connected to common connected second electrodes thereof;

comparing said sensed current level to a reference level by means coupled to respective third electrodes of said first and second switching means, said reference level corresponding to a current level just less than the primary current required for transformer saturation;

alternately deactivating and activating said first and second switching means each time said current level is substantially equal to said reference level wherein transformer saturation is prevented; and inductively loading a secondary winding of said transformer for providing a generally linear ramp shaped increasing waveform to said current through said first and second switch means throughout the conduction thereof, respectively, until said reference level is reached.

7. The method of claim 6 wherein said step of alternately switching is carried out by means of push-pull connected transistors.

8. The method of claim 6 wherein said step of sensing is carried out by means of a sampling resistor.

9. The method of claim 6 wherein said step of comparing is carried out by means of a transistor.

10. A one-transformer DC to DC converter comprising:

a transformer having primary and secondary windings and a feedback winding;

first and second switching means coupled to said feedback winding for providing an oscillator by alternately switching a current, in response to signals from said feedback winding, through a primary winding of said transformer which is connected to like first electrodes of said first and second switching means;

means connected to common connected second electrodes of said first and second switching means for sensing a level of said current therethrough;

means coupled to respective third electrodes of said first and second switching means for comparing said sensed current level to a predetermined reference level, said reference level corresponding to a current level just less than the primary current required for transformer saturation, and alternately deactivating and activating said first and second switching means each time said current level is substantially equal to said reference level wherein transformer saturation is prevented;

means connected to a secondary winding of said transformer for converting a variable polarity voltage signal induced thereat by current in said primary winding to a constant polarity voltage; and means coupled to said converting means for inductively loading said transformer to impart a generally ramp shaped increasing waveform to said current through said first and second switching means throughout the conduction time thereof until said reference level is reached.

11. The converter of claim 10 wherein said first and second switching means comprise transistors, and wherein said comparing means comprises a transistor having a control electrode coupled to said current sensing means and an output electrode connected to common connected first like electrodes of a pair of diodes having second like electrodes connected to said third electrodes of said first and second switching means, respectively.

12. The converter of claim 10 wherein said sensing means comprises a sampling resistor.

13. The converter of claim 10 wherein said converting means comprises a pair of series connected diodes.

14. The converter of claim 10 wherein said inductively loading means comprises a pair of series connected inductors.

15. A method for controlling a one-transformer DC to DC converter comprising the steps of:

alternately switching a current through a primary transformer winding by first and second switching means connected thereto at respective first electrodes thereof and having respective third electrodes thereof coupled to a feedback transformer winding forming a self oscillating transformer circuit;

sensing a level of current through said first and second switching means by means connected to common connected second electrodes thereof;

comparing said sensed circuit level to a predetermined reference level, said reference level corresponding to a current level just less than the primary current required for transformer saturation, by means coupled to said respective third electrodes of said first and second switching means;

alternately deactivating and activating said first and second switching means each time said current level is substantially equal to said reference level wherein transformer saturation is prevented;

converting a variable polarity voltage signal induced at a secondary winding of said transformer by current in said primary winding to a constant polarity voltage; and inductively loading said transformer to impart a generally linear ramp shaped increasing waveform to said current through said first and second switching means throughout the conduction time thereof until said reference level is reached.

16. The method of claim 15 wherein said steps of alternately switching and comparing are carried out by means of transistors.

17. The method of claim 15 wherein said step of sensing is carried out by means of a sampling resistor.

18. The method of claim 15 wherein said step of converting is carried out by means of a pair of series connected diodes.

19. The method of claim 15 wherein said step of inductively loading is carried out by means of a pair of series connected inductors.

* * * * *